(12) United States Patent
Dickinson et al.

(10) Patent No.: US 10,628,092 B1
(45) Date of Patent: Apr. 21, 2020

(54) AUTOMATED SYSTEM AND METHOD FOR PREDICTION OF DEVICE SETTINGS FOR STOCKS

(71) Applicant: Xerox Corporation, Norwalk, CT (US)

(72) Inventors: Charles Dickinson, Pittsford, NY (US); James E. Baxter, Canandaigua, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 16/246,654

(22) Filed: Jan. 14, 2019

(51) Int. Cl.
*H04N 1/00* (2006.01)
*G06F 3/12* (2006.01)

(52) U.S. Cl.
CPC .......... *G06F 3/1205* (2013.01); *G06F 3/1232* (2013.01); *G06F 3/1291* (2013.01)

(58) Field of Classification Search
CPC ..... G06F 3/1205; G06F 3/1232; G06F 3/1291
See application file for complete search history.

(56) References Cited

U.S. PATENT DOCUMENTS

| | | | |
|---|---|---|---|
| 7,812,995 B2 | 10/2010 | Braswell et al. | |
| 2004/0008365 A1* | 1/2004 | Hobbs | G06F 3/1205 358/1.15 |
| 2008/0126860 A1 | 5/2008 | Sampath et al. | |
| 2009/0279115 A1* | 11/2009 | Martin | G06F 3/1204 358/1.13 |
| 2013/0003088 A1* | 1/2013 | Feng | G06F 3/1204 358/1.9 |
| 2014/0176982 A1* | 6/2014 | Burke, Jr. | G06Q 10/087 358/1.14 |
| 2017/0097796 A1* | 4/2017 | Krikke | G06F 3/1208 |
| 2018/0129455 A1* | 5/2018 | Hirasawa | G06F 3/1205 |

\* cited by examiner

*Primary Examiner* — Moustapha Diaby
(74) *Attorney, Agent, or Firm* — Fay Sharpe LLP

(57) ABSTRACT

A system for predicting one or more stock-related device settings, includes memory which stores a crowdsourcing component. The crowdsourcing component acquires reports from multiple printers in a fleet of printers. The reports each include performance data and printer attributes used when printing one of a plurality of stocks, the printer attributes including at least one device setting. A learning component learns relationships between printer settings and performance, e.g., in the form of a prediction model, based on the acquired reports. A prediction component uses the learned relationships to predict device settings for the stock for at least one of the printers in the fleet of printers and a processor, in communication with the memory, which implements the components.

20 Claims, 10 Drawing Sheets

MASTER STOCK DATABASE (MAIN TABLE)

| STOCK ID | TYPE | VENDOR | NOMINAL SIZE | BASIS WEIGHT | FAULTS | PREDICTION | PRINTER PARAMETERS |
|---|---|---|---|---|---|---|---|
| 1 | AWX LETTER | ABC Co. | 8.5 x 11 | 20 | LINK TO TABLE 1 | LINK TO TABLE 20 | LINK TO TABLE 60 |
| 2 | BC BOND | X Co. | 8.5 x 11 | 40 | LINK TO TABLE 2 | LINK TO TABLE 21 | LINK TO TABLE 61 |
| 3 | QAS LETTER | X Co. | 8.5 x 11 | 20 | LINK TO TABLE 3 | LINK TO TABLE 22 | LINK TO TABLE 62 |
| 4 | XXX LETTER | ABC Co. | 8.5 x 11 | 19.5 | LINK TO TABLE 4 | LINK TO TABLE 23 | LINK TO TABLE 63 |

FIG. 5

TABLE 20: STOCK ID 1

| TEMP C | RELATIVE HUMIDITY | | | | | |
|---|---|---|---|---|---|---|
| 1. RATINGS FOR PRINTER TYPE A | | | | | | |
| | 25-34 | 35-44 | 45-54 | 55-64 | 65-74 | 75 AND OVER |
| 20-24 | 4 | 5 | 4 | 4 | 3 | 1 |
| 25-29 | 5 | 5 | 5 | 4 | 3 | 1 |
| 30-34 | 4 | 4 | 4 | 3 | 2 | 1 |
| 35 AND OVER | 3 | 2 | 1 | 1 | 1 | 1 |
| 2. RATINGS FOR PRINTER TYPE B | | | | | | |
| ... | | | | | | |

| TABLE 60: STOCK ID 1 | | | | |
|---|---|---|---|---|
| TEMP C | RELATIVE HUMIDITY | | | |
| SETTINGS FOR PRINTER TYPE A, RH 25-34 | | | | |
| TEMP | FEEDER SETTING | FUSER SETTING | NIP SETTING | COLOR SETTING |
| 20-24 | 1 | 3 | 2 | 1 |
| 25-29 | 1 | 3 | 3 | 1 |
| 30-34 | 2 | 2 | 3 | 3 |
| 35 AND OVER | 2 | 1 | 4 | 4 |
| SETTINGS FOR PRINTER TYPE A, RH 35-44 | | | | |
| ••• | | | | |

| TABLE 1 | AWX LETTER | | RECOMMENDATIONS | | | |
|---|---|---|---|---|---|---|
| | FEEDER FAULTS | PAPER JAMS | BEST FOR TEMP C | BEST FOR RH | SETTINGS | ALTERNATIVES |
| FUSER FAULTS | | | | | | USE QAS LETTER FOR TEMP>30, AND/OR RH>50 |
| 6 | 0 | 2 | 20-30 | 30-50 | USE MODIFIED FUSER SETTINGS | |

AUTOMATED SYSTEM AND METHOD FOR PREDICTION OF DEVICE SETTINGS FOR STOCKS

CROSS REFERENCE TO RELATED PATENTS AND APPLICATIONS

Cross reference is made to co-pending application Ser. No. 16/246,616, filed Jan. 14, 2019, entitled AUTOMATED STOCK EVALUATION SYSTEM AND METHOD, by Charles Dickinson, et al., the disclosure of which is incorporated herein by reference in its entirety.

BACKGROUND

The exemplary embodiment relates to print media evaluation and finds particular application in connection with a system and method for making predictions for suitable device settings (e.g., device parameters and/or set-up routines to be followed for establishing the device parameters) for a printer in a fleet of printers, based on feedback from the fleet of printers.

Often, print-related services and solutions entail providing onsite resources to a customer operating one or more printers, such as software, hardware and personnel, to assist the customer in ensuring that their printers function properly. In addition, numerous print-related services and solutions may operate autonomously, even though they utilize similar delivery mechanisms and backend connectivity. As such, providing print-related services can often be costly and inefficient.

Customers often have a wide choice of suppliers and types of print media ("stock") for their printers. However, some stocks perform better than others for a given model or configuration of printer, or under particular environmental conditions, and the customer cannot easily predict whether a new type of stock will work well on the customer's printer.

Currently, customers spend considerable time determining optimal machine settings for each stock by trial and error. While they may obtain some assistance from a service technician, this can delay the setting up of a printer for the stock. Additionally, the technician may not have up-to-date, accurate information, since when a given customer finds better settings for a particular stock, that information is not shared with other customers.

There remains a need for a system and method for sharing information on machine settings and set-up routines in a way which can be utilized across a fleet of printers.

INCORPORATION BY REFERENCE

The following references, the disclosures of which are incorporated herein by reference in their entireties, are mentioned:

US Pub. No. 20140176982 A1, published Jun. 26, 2014, entitled METHOD AND SYSTEM FOR MANAGING PRINT STOCK INFORMATION USING A CLOUD ADMINISTRATION SYSTEM, by Burke, Jr., describes a cloud administration system for managing stock information in a network printing context.

US Pub. No. 20080126860 A1, published May 29, 2008, entitled FAULT MANAGEMENT FOR A PRINTING SYSTEM, by Sampath, et al., describes a printing system which includes fault management agents associated with print media processing modules for acquiring fault-related data.

BRIEF DESCRIPTION

In accordance with one aspect of the exemplary embodiment, a system for predicting one or more stock-related device settings includes memory which stores a crowdsourcing component, which acquires reports from multiple printers in a fleet of printers, the reports each including performance data and printer attributes used when printing one of a plurality of stocks, the printer attributes including at least one device setting. A learning component learns relationships between printer settings and performance, based on the acquired reports. A prediction component which uses the learned relationships to predict device settings for the stock for at least one of the printers in the fleet of printers and a processor, in communication with the memory, which implements the components.

In accordance with another aspect of the exemplary embodiment, a method for predicting one or more stock-related device settings includes acquiring reports from multiple printers in a fleet of printers. The reports each include performance data and printer attributes used when printing a respective one of a plurality of stocks, the printer attributes include device settings. Device settings are generated for printing a print job on one of the plurality of stocks with one of the printers in the fleet, based on the acquired reports.

One or more steps of the method may be performed with a processor.

In accordance with another aspect of the exemplary embodiment, a method is provided for selecting device settings for printing a print job on a printer in a fleet of printers with a selected stock. The method includes setting printer settings for a first of the fleet of printers to print a first print job on a first stock, the first stock having a set of stock attributes, printing the first print job using the first stock on the first printer using the printer settings, and generating at least one report for the stock based on performance data generated by the first printer. The method further includes submitting the at least one report to a stock management system, receiving, from the stock management system, printer settings for printing a second print job on the first printer with a second stock, the printer settings for the second stock having been derived from a plurality of reports for the stock based on performance data generated by at least a second of the plurality of printers.

One or more steps of the method may be performed with a processor.

BRIEF DESCRIPTION OF THE DRAWINGS

FIG. 5 illustrates a main table of a master database;

FIG. 6 illustrates a stock performance table of a master database;

FIG. 7 illustrates a printer settings table of a master database;

FIG. 8 illustrates stock related information to be presented to a user;

DETAILED DESCRIPTION

An automated media programming system and method are described herein for providing stock-related device settings to device users and/or devices, based on feedback from a fleet of devices.

In one embodiment, an artificial intelligence (AI) cloud-based stock management system receives device data from a fleet of devices in the field, such as printers. The device data may include, for a given stock, device settings (device parameters and/or set-up routines used in selecting the device parameters), environmental conditions (e.g., temperature, humidity, and/or pressure), and recorded performance data (such as jams). The stock management system predicts optimal settings and/or set-up routines for each stock, based on the device data received, which may be tailored to a particular device type and/or environment. The predictions may be refined as more device data is collected from the devices.

In another embodiment, the stock management system uses data from a population of devices in the field, such as printers, to predict whether a selected stock will function adequately on a given device, where "adequately" may be expressed in terms of one or more thresholds, ranges, etc. for performance.

In another embodiment, the stock management system uses data from a population of devices in the field to recommend a stock for use in a given device (which may be predicted to perform better than the selected stock, based on one or more of the thresholds, ranges, etc. for performance).

In some embodiments, the system may automatically check the measured stock size, for a stock loaded in a device tray, against a nominal stock size stored in a stock library. In some embodiments, the system may identify and suggest alternative stocks to the user, such as stocks with the same stock attributes (e.g., size, weight, finish) that are expected to work well in a given environment. In some embodiments, the system may identify and suggest environmental conditions (e.g., a modified humidity) that is predicted to improve how well a selected stock would perform.

In various embodiments, the stock management system makes use of one or more of: performance data generated when a stock is in use by devices in the population of devices, printer settings, stock attributes, customer ratings, environmental factors, print job-related factors, and the like, e.g., for one or more of: predicting suitable stocks, predicting ratings for a set of stocks, predicting optimal printer settings/set-up routines for a stock, predicting modified environmental factors, combinations thereof, and the like.

Figure 1:
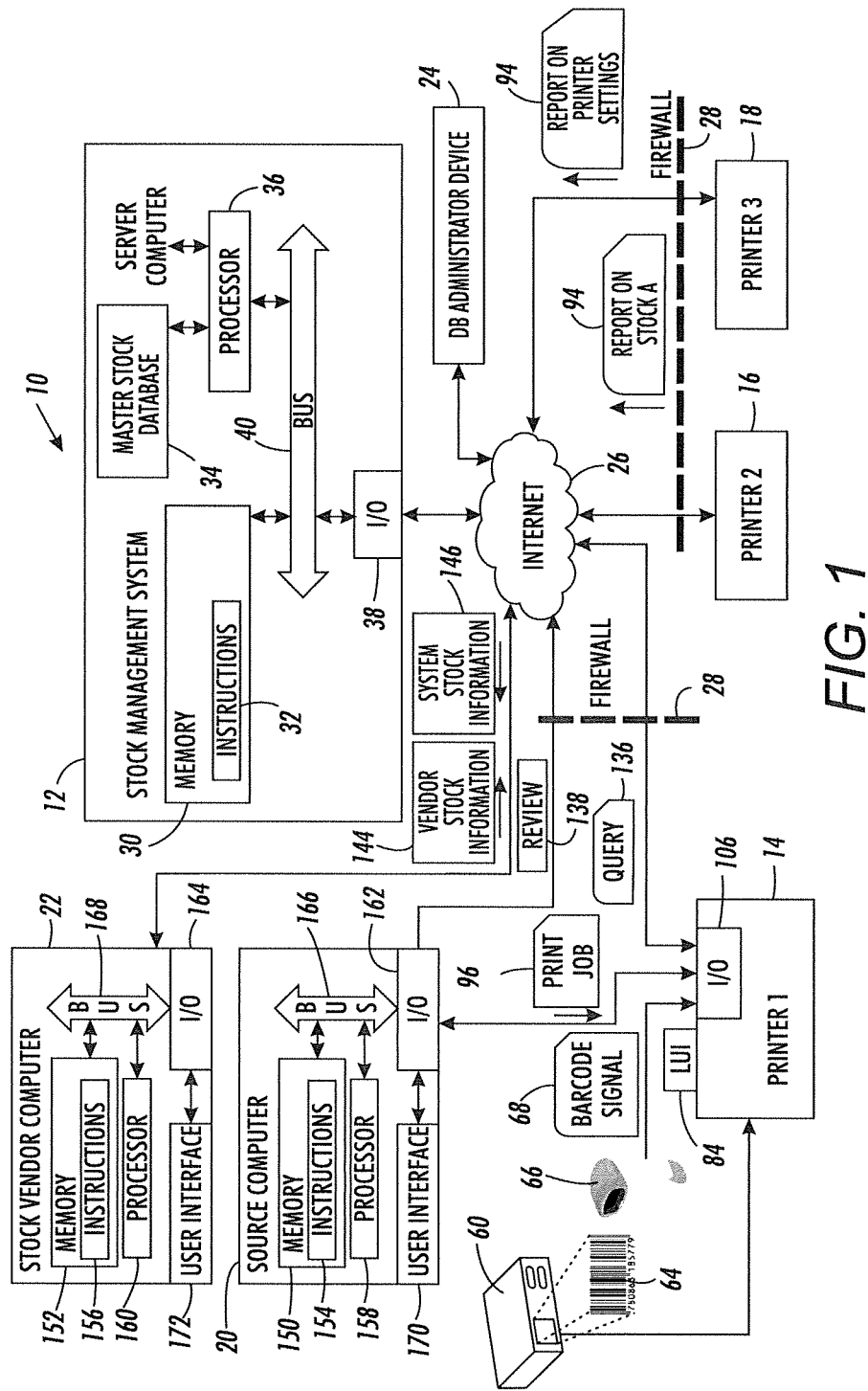
FIG. 1 is a functional block diagram of a networked feedback system.

With reference to FIG. 1, an example networked printing environment 10 is illustrated in which a cloud-based stock management system 12, a fleet of managed devices (illustrated as printers 14, 16, 18), and optionally one or more client computing devices (illustrated by source computer 20, a stock vendor computer 22, and an administrator computing device 24) cooperate to perform the methods described herein. A computer network 26, such as a wired or wireless local area network or wide area network, links the various devices (printers 14, 16, 18 and computing devices 20, 22, 24) to the stock management system 12 and/or links one or more of the devices 14, 16, 18, 20, 22, 24 to each other. Communication between the managed devices 14, 16, 18 and the stock management system 12 may be through one or more firewalls 28.

The stock management system 12 includes memory 30 which stores instructions 32 for interacting with the various devices 14, 16, 18, 20, 22, 24 and for managing (e.g., generating, updating, and/or accessing) a master stock library 34, which may be in the form of a database, or other data structure. A processor 36, in communication with the memory, executes the instructions 32. One or more input/output (I/O) components 38 allow the system 12 to communicate with external devices, such as devices 14, 16, 18, 20, 22, 24. Hardware components 30, 36, 38 of the system 12 may communicate via a data/control bus 40.

Figure 2:
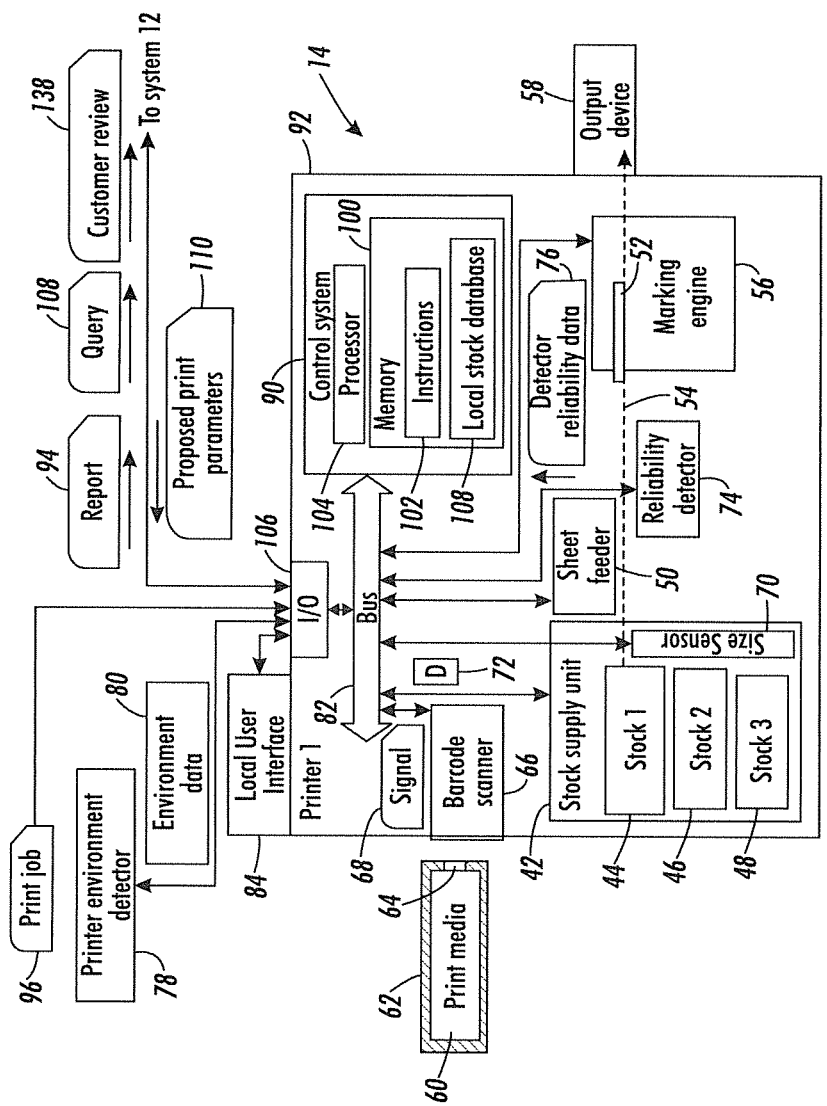
FIG. 2 is a functional block diagram of an example printer in the system of FIG. 1.

An example managed device in the form of a printer 14 is illustrated in FIG. 2. Printers 16, 18, etc., may be similarly configured. The printer 14 includes a stock supply unit 42, which houses one or more sources 44, 46, 48 of print media ("stock"), such as paper trays. A sheet feeder 50 feeds sheets 52 of print media singly from the supply unit 42 onto a paper path 54. The sheets are transported downstream, from the sheet feeder 50, along the paper path 54 by a transport system, such as a collection of nip rollers, conveyor belts, or the like, (not shown) to a marking engine 56, which applies images to the sheets, using marking materials, such as inks or toners. The printed sheets are output to a printed media output device 58, such as a tray. The illustrated marking engine 56 employs xerographic printing technology, in which an electrostatic image is formed on a photoconductive surface, such as a belt or drum. Toner particles are attracted to the electrostatic image and then transferred to a sheet of print medium, such as paper. The toner particles are fused to the print medium in a fuser, by application of heat and/or pressure. However, marking engines employing other printing technologies, such as ink jet transfer, thermal impact printing, or the like, can be employed.

A user of the printer 14 fills the print media sources 44, 46, and/or 48 with fresh stock 60, which may be supplied in a package 62. Identifying information 64, such as a barcode, QR code, or RFID, may be printed on or affixed to the package 62, or otherwise supplied with the print media. An information reader 66, such as a barcode scanner, mobile phone camera with associated software, or RFID reader, reads the identifying information 64 and outputs a corresponding signal 68. A size sensor or sensors 70, which may be located in the stock supply unit 42, determines the actual dimensions (D) 72 of the sheets (e.g., length and width) in one or more of the stock trays 44, 46, 48, which can then be checked against the nominal dimensions. The actual dimensions may differ from the nominal dimensions associated with the barcode 62 (e.g., stored in master stock database (MDB) 34), or there may be no nominal dimensions associated with the barcode.

A reliability detector 74 or detectors (such as one or more sensors positioned throughout the printer) generates and outputs fault-related and/or other performance data 76 based on information from one or more components of the printer, which may be indicative of one or more faults/reliability issues which may be attributable, at least in part, to the print media 60 used in printing. The performance data 76 may thus pertain to one or more faults relating to usage of a given stock that are experienced by a printer over a period of time. Example performance-related information detected by the sensors 74 may include sheet feeding errors, fusing problems, paper jams (e.g., as a number of jams or a jam rate), tray or feeder malfunctions, image quality defects (e.g., detected using a full width array sensor), and the like. The performance data 76 may include or be linked to one or more of: an identifier associated with the printer 14 that experienced the fault, a time stamp of when the fault was encountered, a description of the fault encountered, an identification of the stock being used when the fault was encountered, the environmental conditions (e.g., temperature, humidity) and/or the like.

US Pub. No. 20080126860 A1, for example, describes various sensors which can be used to acquire performance-related information, including the basic type of sensors used for control purposes as well as additional sensors that provide enhanced diagnostics and prognostics as well as virtual sensors (components which record data for other purposes which can be utilized for identifying performance issues). The type of faults which may be detected depend on the sensors available in the printer.

A printer environment detector 78, such as one or more of a heat sensor, a humidity sensor, and a barometric pressure sensor, detects and outputs environment data 80 on the printer environment, either within the printer, or in a region local to the printer. Other environmental conditions which may affect device performance may also or alternatively be detected, such as altitude, levels of one or more atmospheric pollutants/particulates, and the like.

A local user interface (LUI) 84, which may be local to the printer, as shown, allows a user to interact with the printer and/or the system 12, e.g., during setup of printer functions for printing new print media, described in detail below. The LUI 84 may include a display device for displaying information to users and a user input device, such as a keypad, touchscreen, or the like, for receiving user inputs.

A control system 90 controls the operations of the printer 14. The control system may be local to the printer, e.g., housed in or on the printer housing 92, e.g., as a computing device sometimes referred to as a digital front end (DFE), or in the LUI 84. Or, the control system 90 may be wholly or partly located on a linked computing device, such as a print server (not shown), which receives print jobs 96 from the source computer(s) 20 and directs them to selected printers. In addition to controlling the components 42, 56, 58, etc., of the printer during printing, the control system 90 receives data inputs from various components of the printer, such as one or more of: signals 68 from the barcode scanner 66, size measurements 72 from the size sensor 70, fault data 76 from the reliability detectors 74, environment data 80 from the environment detector 78, and user inputs from the LUI 84.

The control system 90, among other things, generates reports 94 of performance data for a given stock, based on one or more of these data inputs. The reports 94 are sent to the stock management system 12 for aggregating with reports from other managed devices 16, 18, etc., and generating information therefrom, e.g., for generating and/or updating the MDB 34, making stock predictions, predicting suitable print parameters, and the like. The control system 90 receives print jobs 96 for printing on one or more of the printers from the source computer(s) 20 and/or other input device (such as a USB stick) and controls the printing of the print jobs on selected print media 60.

The control system 90 includes memory 100 which stores instructions 102 for performing parts of the method described below. A processor 104, in communication with the memory 100, executes the instructions 102. One or more input/output (I/O) devices 106 allow(s) the control system 90 to communicate with external devices, such as the source computer 20, vendor computer 22, and/or stock management system 12, and components 42, 50, 56, 58, 66, 68 of the printer. Hardware components 42, 50, 56, 58, 66, 70, 74, 78, 90 (100, 104), 106 of the printer 14 may communicate via a data/control bus 82. The control system 90 may also include, e.g., in memory 100, a local stock database (LDB) 108, or otherwise have access to the LDB 108. The LDB 108 may be a clone of or derived from (e.g., a part of) the MDB 34.

The printer 14 may be any device suitable for printing on print media, such as a standalone printer, copier, or a multifunction device which provides a combination of features, such as printing, scanning, and/or faxing. As will be appreciated, the printer may include other components in addition to those shown.

Figure 3:
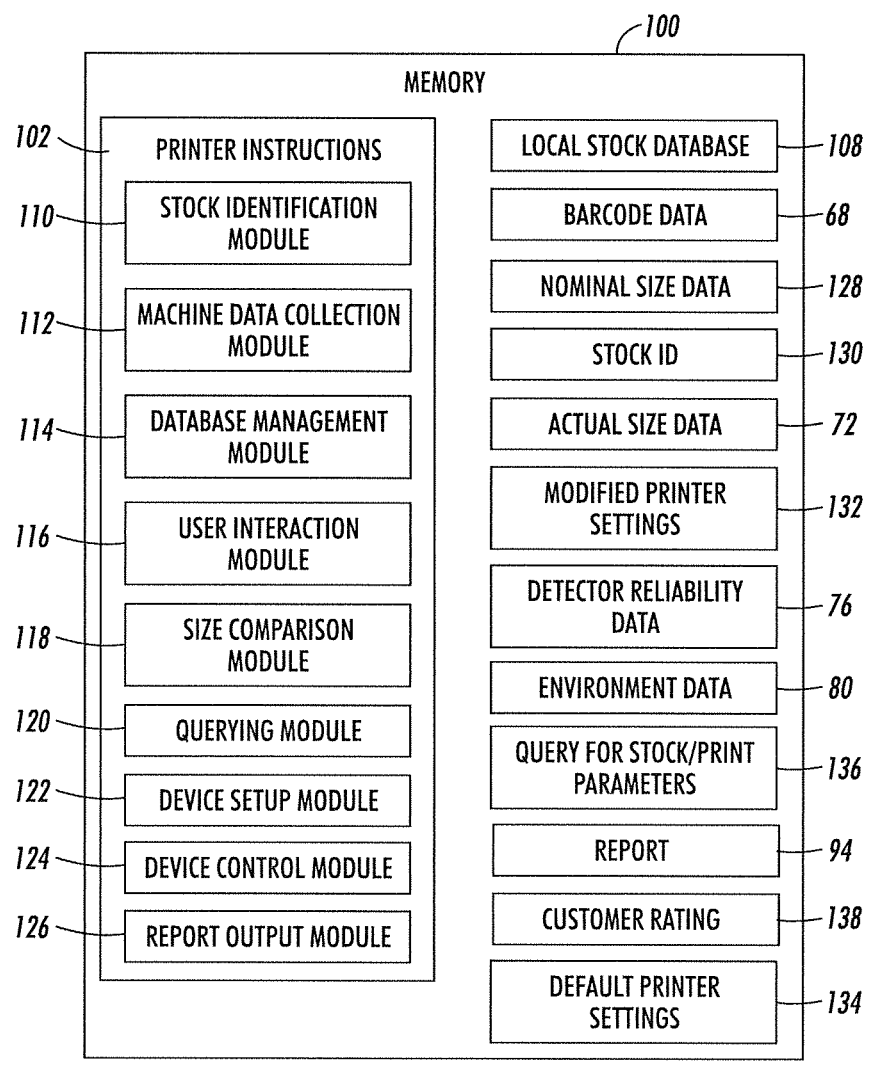
FIG. 3 illustrates example software components employed by the printer of FIG. 2.

With reference also to FIG. 3, the printer instructions 102 may include various software components, such as a stock identification module 110, a machine data collection module 112, a database management module 114, a user interaction module 116, a size comparison module 118, a querying module 120, a device setup module 122, a device control module 124, and a report output module 126.

Briefly, the stock identification module 110 receives the barcode data 68, generated by the barcode scanner 66, and retrieves stock-related information corresponding to the barcode 64, such as nominal paper dimensions 128 and a stock identifier 130. The stock identification module 110 may access the local stock database 108 with the barcode 64 or stock identifier 130 to retrieve other information 132 related to the stock, such as suitable printer settings. Each stock may be associated with default settings for one or more printer components for executing an input print job 96.

The machine data collection module 112 collects and stores performance data 76 from components of the printer 14, output by the detectors 74. The module 112 may collect associated information on printer settings and the printer environment.

The database management module 114 manages (e.g., updates) the local stock database 108, based on information stored in the MDB 34. For example, information relevant to the printer 14 is periodically downloaded from the cloud-based stock management system 12. Alternatively, or additionally, the information is downloaded when a stock barcode is scanned or the printer otherwise detects loading of a different stock from one currently in use.

The user interaction module 116 interacts with a user of the device 14 via the LUI 84, e.g., for set up of various functions of the control system 90, e.g., selecting modified printer settings 132, providing an automated assessment of stock selections, and for receiving user queries 136, such as a request for the identity of a suitable print media for optimal printing of a given print job.

The size comparison module 118 compares the determined size data 72 of the stock, as loaded in a device tray and measured by the size sensor 70, against the nominal size data 130 for the associated stack ID, which may be stored in the master or local database and retrieved by the stock identification module 110. If at least one of the length and width actual dimensions does not match the corresponding nominal dimension (e.g., exceeds a threshold difference) the size comparison module 118 records an error, which may be output to the user on the LUI 84 by the user interaction module. For example, the user may be warned that the stock does not meet tolerances and may be prompted to re-program the stock or load a different stock that matches the programmed size. If both the dimensions match (do not exceed a threshold difference), the size comparison module 118 may signal that the actual stock dimensions are within tolerance.

The querying module 120 generates a query 136 to be sent to the stock management system 12. The query 136 may ask the system 12 to perform one or more of: identify a stock for use in a given print job, check that the stock will perform adequately on the printer, suggest an alternative stock to one the customer has selected (for example, if the system determines that the stock will not perform adequately), suggest device settings for a given job/stock, combination thereof, or the like. The query 136 may be based on user inputs via the LUI 84, and/or be automatically generated, based on device settings for the print job to be printed, available stock, printer environment, or a combination thereof.

The device setup module 122, in cooperation with the user interaction module 116, assists a user in programming the printer components to run optimally for printing print jobs on a new stock. A new stock is generally one which has not been used on the customer's printer 14 before, although it may have been used in other printers 16, 18, etc. in the fleet. The setup module 122 may generate/retrieve modified printer settings 132 to be used by the printer components when the new stock is used, which may be substituted for default printer settings 134, that are used in the absence of overriding instructions. The device setup module 122 may communicate with the stock management system 12/LDB to obtain relevant information based on the aggregated reports 94.

The device control module 124 is configured to control the printer components 42, 50, 56, 58, 64, etc., in the execution of print jobs 96, based on one or more of: the default print settings 134 stored on the printer, modified printer settings 132 established during set up for the stock, information retrieved from the local stock database 108 and/or MDB 34, inputs from a user via the LUI 84, other information, or a combination thereof.

The report output module 126 generates and outputs reports 94 for stock used in printing print jobs 96 executed on the respective printer 14. Each report 94 may include and/or be based on at least some of:

a) a time stamp;
b) stock attribute(s), such as one or more of:
   i) a unique stock identifier (stock ID) 130, which may be user supplied or acquired from the identifying information from the barcode reader 68,
   ii) specific stock attributes, such as one or more of weight, color, size, coating type (e.g., based on the identifying information 68 from the barcode reader, size sensor 70, and/or information from the user),
c) printer attributes, such as one or more of:
   i) a printer identifier, e.g., a serial number or a printer key (which is a combination of a serial number and a time stamp or other time-dependent information),
   ii) fixed printer features, which are fixed for a given device (e.g., type of printer (e.g., inkjet vs laser), specific components of the printer),
   iii) printer settings 132, 134, which are adjustable for a given device, which may be set during programming the media (e.g., by a user) or by default otherwise. Example settings include fuser or dryer temperature settings, nip pressures, first transfer set point(s), registration settings, developer or print head settings for tone reproduction curves (TRCs), colorants used, print speed, and specific setup routines used for programming the media, e.g., for achieving image quality;
   iv) machine component lifetime signals (e.g., High Frequency Service Item (HSVI) counters, such as number of prints since last replacement for drum cartridges, dry ink/toner cartridges, dry ink/toner waste container, and the like);
d) performance data 76, based on or including the information received from the performance (fault) detector (s) 74, such as event type, image counter, latest download from the database 34, machine condition (e.g., operational vs offline), type of fault, and the like;
e) environment data 80 (e.g., relative humidity, temperature, barometric pressure, pollutant levels) acquired from the printer environment detector 78;
f) print job features (e.g., double sided vs single sided printing, monochrome vs color printing, finishing options, such as stapling, collating);
g) user-supplied information, such as a subjective rating or comments supplied by a user; and the like.

The printer may track and keep a set of such information which is used to generate on demand or periodic reports 94.

As will be appreciated, the information may be provided in separate reports 94. For example, a first type of report based on or including printer attributes, such as printer settings ("settings report"), may be generated when the user programs a stock, while a second type of report based on or including performance data ("performance report") may be generated subsequently, over the course of one or more print jobs printed with the stock. The different types of report may be subsequently linked to each other by the system 12, e.g., through time stamps, printer ID, and/or other common information.

In some cases, the performance report 94 may include an automatically-generated rating for one or more performance factors, such as fuser problems, paper jams, and the like. The rating on the performance of the stock may be simply an inference based on the detected faults, unless the user supplies a rating at the time of printing.

In some cases, the performance report 94 may encode information such as "stock always runs well"; "stock runs well in environment X (e.g., temperature $T_1$/humidity $H_1$); "stock does not run well in environment Y (e.g., temperature $T_2$/humidity $H_2$)"; "stock never runs well"; stock does not run well with printer settings Z (fuser temperature $F_1$, feeder speed $S_1$, etc.).

The performance report 94 may be based on performance data 76 acquired over the course of at least two print jobs 96 printed using the same stock. In another embodiment, the report 94 is based on data for a single print job.

The reports 94 are transmitted to the stock management system 12. In some embodiments, reports 94 may be automatically uploaded to the system 12, e.g., periodically. In some embodiments, the system 12 may request a report 94 for a given stock to be uploaded, for example, when the system 12 is asked to determine whether a stock will print well, make a recommendation for a stock to be used in printing a print job on one of the fleet of printers 14, 16, 18, or for determining optimal printer settings.

The reports 94 received from the fleet of devices 14, 16, 18 may thus serve as crowdsourcing data which is used by the system 12 to predict one or more of: whether a stock will perform well, a suitable stock 60 for a printer/print job, and printer settings 132 for a new print job to be rendered on any one of the devices 14, 16, 18 in the fleet.

Customers may also provide their own reviews 138 for a stock 60 which has been used in one of the printers 14, 16, 18. The customer review 138 of a stock, together with details on the type of printer on which the stock was used, may be generated through a web portal and may include a rating of the stock's performance. The customer review 138 may lack detailed information about printer settings, environment, and the like, which is available from the printer reports 94, but may give a more accurate description of observed problems. Combining the customer reviews 138 with the corresponding printer reports 94 may therefore be useful in linking observed/detected performance problems with printer settings etc., which may have contributed to them.

Returning to FIG. 1, the printer 14 receives the jobs 96, such as print jobs, from the source 20 of print jobs, such as the illustrated source computer, a USB device, or other suitable memory storage device. The printer executes the print jobs by rendering images on selected print media 60. Each print job 96 may specify the type of print media to be used in printing the print job and/or the print media source 44, 46, 48 from which the media 60 is to be fed.

The stock vendor computer 22 allows a supplier of the print media to provide stock information 144, about different types of stock, directly to the stock management system 12. For example, the stock vendor may upload, or allow the management system to upload, information 144 for a given stock, such as an identifier, weight, nominal size, color, finish, and the like. In some cases, the stock management system 12 may provide the stock vendor with relevant information 146 concerning the vendor's stocks, such as that some stocks do not work well under certain conditions. This information may be based on the reports 94, received from multiple printers and optional user comments 138, and is generally anonymized to protect the identities of the customers and their confidential information.

Computing devices 20, 22 may include respective memory 150, 152, storing instructions 154, 156 for performing the various functions described herein, a processor 158, 160, in communication with the memory for executing the instructions, an input/output device 162, 164, bus 166, 168, and a user interface 170, 172, such as a keyboard, keypad, display, touch screen, mouse, or combination thereof. The administrator device 24 may be similarly configured.

The cloud-based stock management system 12 may be hosted by one or more computing devices, such as a server computer or computers. All source computing devices 20 and vendor computing devices 22 may be located remote from the stock management system 12.

Figure 4:
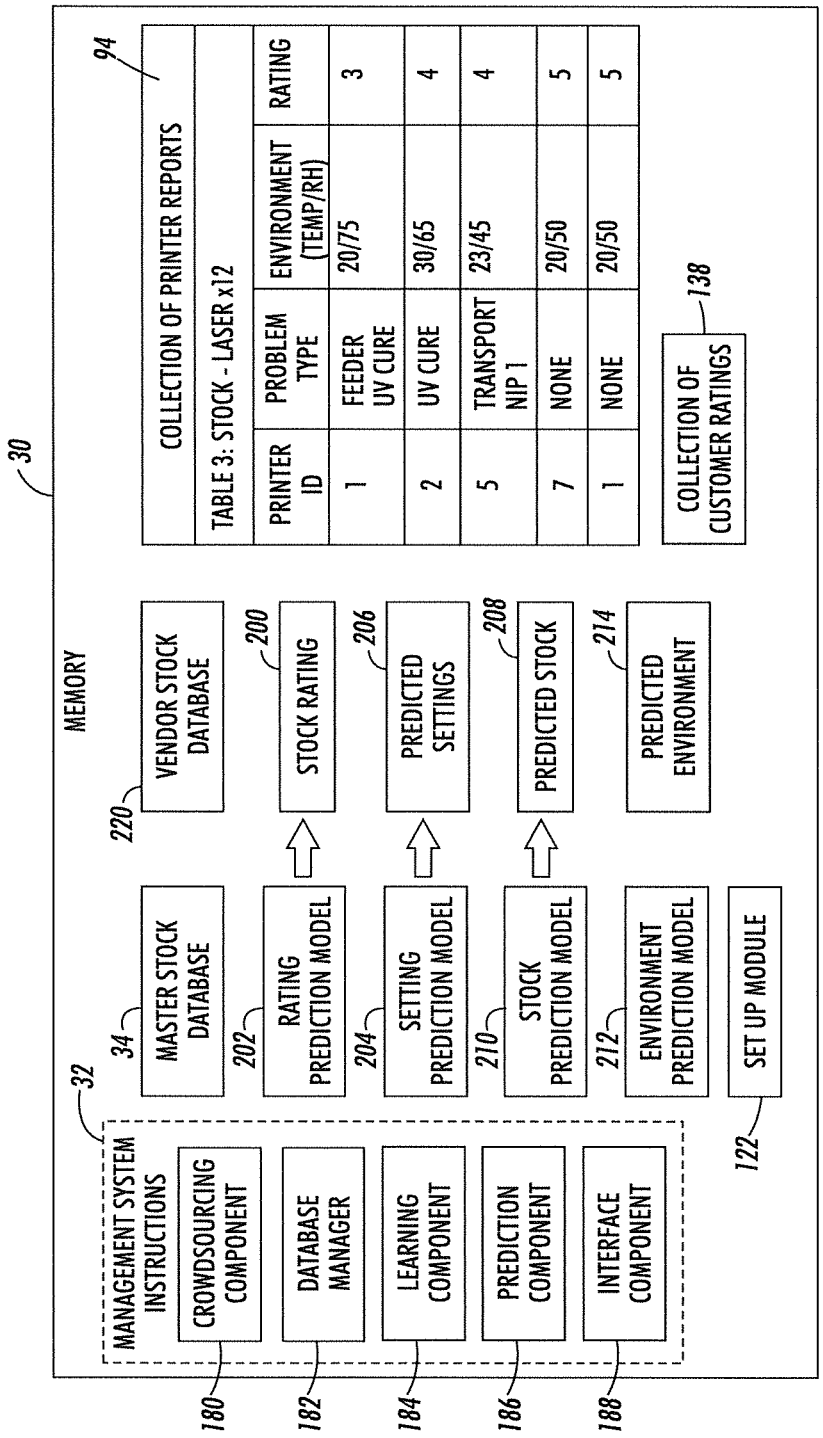
FIG. 4 illustrates example software components and data stored by the stock management system of FIG. 1.

With reference to FIG. 4, the stock management system 12 includes various software components 32 for performing the functions described herein, including a crowdsourcing component 180, a database manager 182, a learning component 184, a prediction component 186, and an interface component 188.

Briefly, the crowdsourcing component 180 collects and optionally aggregates the reports 94 from the fleet of printers.

The database manager 182 maintains the MDB 34 and provides for downloading of the MDB 34, or a part thereof, to the local stock databases 108, at intervals. Each database 34, 108 may include a set of linked database tables, or other data structures for storing print media-related information. As an example, the databases 34, 108 may include, a main database table 190 (FIG. 5), a stock prediction table 192 (FIG. 6), a printer settings table 194 (FIG. 7), and a faults table 196 (FIG. 8). Some of these tables may be split into smaller tables or combined. Tables may be stored in a suitable database format, such as a relational database, which can be queried. In some cases, database tables may be created on-the-fly, e.g., to focus on items relevant to a particular printer type and/or stock.

The illustrated main database table 190 includes, for each of a set of print media types, some or all of: an identifier (stock ID), such as the barcode information 68, a name of the print media, nominal dimensions of the print media, actual dimensions of the print media, if known, which may be different from the nominal dimensions, basis weight, finish, vendor information, and the like. The main database table 190 may include or be linked to the stock prediction table 192, a device (printer) settings table 194, and a faults table 196 by links 198. There may be a separate ratings table 192 for each stock, which is derived from the reports 94 received from multiple devices in the fleet. The ratings table 192 may be generated, at least in part, based on the reports 94 and optionally customer reviews 138.

The stock prediction table 192 may include, for a given stock, some or all of: predicted performance ratings 200; printer features; device (printer) settings; print media information, print job features, environmental data, user supplied information, combinations thereof, and the like. As an example, FIG. 6 shows predicted performance ratings 200 for each stock aggregated according to different temperature and humidity ranges, which may be further specialized by printer type, although other data structures are also contemplated. The illustrated performance ratings are on a scale of 1-5 where 1 is the lowest (the given stock is not expected to perform well) and 5 is the highest (the stock is expected to perform well). The cells of the table thus may each include a performance rating 200 or other evaluation measure for a given temperature range and humidity range. There may be different types of stock performance ratings, such as an overall stock performance, a stock performance based only on one performance measure, such as jam rate, an environment-based stock performance, and the like.

The performance rating 200 for a stock may be simply be an aggregation, by the learning component 184, of the reports 94 relevant to that cell, such as an average of the overall ratings based on two or more detected types of fault, or average of a single rating, such as jam rate, over all, or at least a subset of, the reporting printers. In other embodiments, the performance rating 200 may be generated using the rating prediction model 202. The rating prediction model 202 may generate the prediction 200 based on features such as one or more of: customer reviews 138, reports 94, accompanying machine attributes, environmental data, and the like. The stock prediction model 202 may be trained by a machine learning method to predict a stock performance rating for a given stock and device attributes. The training may employ training data, such as a stock identifier (and/or features of the stock, such as weight, size, finish) and previously-acquired reports 94 and/or customer reviews 138, and associated information for the stock. The learning component 184 may place a greater weight on recently-received reports 94/customer reviews 138, and/or reports 94/customer reviews 138 may be automatically discarded after a given period of time, to reflect possible changes in the stock and/or modifications to printer software and/or hardware, for example.

The device settings table 194 includes predicted device (printer) settings (device parameters and/or routines for setting them) for use with a given stock and/or type of print job. These may be specialized by environment conditions, printer type, combination thereof, or the like. For example, FIG. 7 shows suitable device settings (numbers, for ease of illustration) for a given printer type and humidity range, at different temperatures. Each cell thus includes a device setting for one of the printer components. These are illustrated as a feeder setting, a fuser setting, a nip setting, and a color setting, although more fine-grained settings may be provided. The device settings incorporated in the table may be device parameters and/or proposed set-up routines for establishing such parameters. The settings table 194 may be generated, at least in part, by the prediction component 184, from the printer settings provided with the reports 94.

The prediction component 184 may use a settings prediction model 204 to predict settings 206 for one or more (or all) cells of the settings table. The settings prediction model 204 may be trained on training data which includes the stock identifier (and/or features of the stock, such as weight, size, finish), printer settings, and corresponding stock performance ratings for the stock, extracted or inferred from the reports 94 and/or extracted from the customer reviews.

The optimal printer settings 206 predicted for a printer for running a particular stock may include, for example, settings for components, such as fuser temperature, nip pressures, colorants used, etc. The optimal settings 206 may additionally or alternatively include particular set-up routines for the user to be walked through to set up printer components and/or printing operations that are beneficial for running the stock.

The faults table 196 may provide a human-readable summary of types of faults encountered with a given stock type. The summary for each stock may be based on the aggregated reports 94 and/or customer reviews 138. As an example, FIG. 8 shows the number of faults of each general type detected in the reports (this could alternatively be replaced by a proportion of print jobs experiencing a particular fault type for a clearer comparison with other stocks). The table 196 also includes recommendations based on the reports, such as optimal environment ranges and settings for reducing faults, alternative print media, and the like. The faults table 196, or a portion thereof, may be generated on-the-fly to provide customer/printer-specific recommendations.

The learning component 184 may learn a stock prediction model 210, which is trained using crowdsourced data 94, 138 and/or the MDB 34 as training data. In one embodiment, the stock prediction model 210 is trained to predict whether a particular stock will function adequately on a given device and/or for a given print job. In this embodiment, the training data may include one or more of: the performance (fault) data 76 generated when the stock is in use by devices in the population of devices; environmental factors; printer settings, print job-related factors; and the like.

The prediction model 210 may be trained to predict alternative stocks to the user, such as stocks with the same stock attributes (e.g., size, weight, finish) as an initially-selected stock, that work well in a given environment.

In some embodiments, a prediction model 212 is trained to predict environmental conditions 214 (e.g., a modified humidity and/or temperature) that are expected to improve how well a selected stock would perform. The environment prediction model 212 is trained on the reports 94 relevant to a stock.

The prediction component 186 uses the learned model(s) 202, 204, 210, 212 to make predictions 200, 206, 208, 214. In some embodiments, one or more of the predictions 200, 206, 208, 214 may be used to update the master database 34.

In some embodiments, the prediction component 186 uses the learned model 202 to generate a stock prediction 200 for a customer on-the-fly, e.g., when the user, or the printer 14, queries the system. The prediction component may input the customer's printer attributes, such as fixed printer features, into the model 202, which outputs a predicted stock or predictions from which an optimal stock can be selected.

In some embodiments, the prediction component 186 generates predicted printer settings 206 for a customer on-the-fly, e.g., when the user, or the printer 14, queries the system. In some embodiments, the prediction component 186 may input stock attributes and available printer attributes for a stock into the model 204, which outputs recommendations 206 of printer settings suitable for the customer's printer or predictions from which suitable settings can be selected.

In some embodiments, the prediction component 186 uses the learned model 212 to generate a prediction for an environment 214 for a customer on-the-fly, e.g., when the user, or the printer 14, queries the system. The prediction component may input the customer's printer attributes, such as fixed printer features, and a selected stock into the model 212, which outputs a predicted environment 214 or predictions from which an optimal environment can be selected. The customer can then modify the printer environment to the extent possible, e.g., by using a heater, air conditioner, humidifier, dehumidifier, fan, or combination thereof.

The interface component 188 may provide the printers 14, 16, 18 with the setup module 122 (or "wizard"), which generates a graphical user interface displayed on the LUI 84. The setup wizard assists the user in setup of the stock-related features on the printer 14. The interface component 186 may also provide a web-based GUI where users can obtain one or more of stock ratings 200, stock recommendations 208, printer settings 206, environments 214, for selected stocks/printers, using queries 136.

Figure 9:
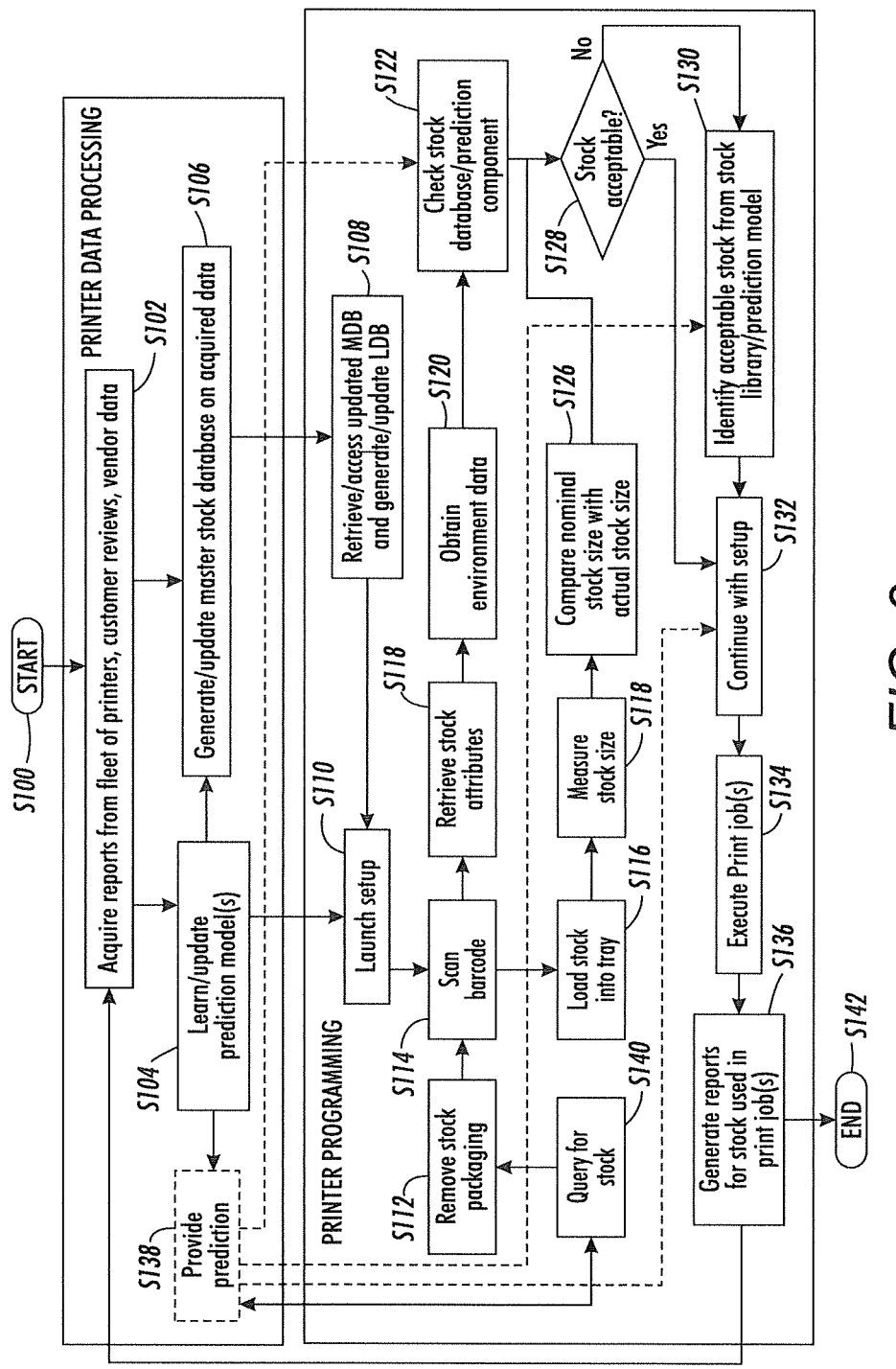
FIG. 9 is a flow chart illustrating a method of media programming.

A computer-assisted method of printer programming is shown in FIG. 9. The method begins at S100.

At S102, a collection of reports 94 is acquired by the system 12 from one or more printers 14, 16, 18 in the fleet. Stock attributes and/or recommended printer settings may also be received from vendors. Information is extracted from the reports.

At S104, one or more prediction models 202, 204, 210 is/are learned and/or updated, based on the acquired reports 94 and/or other relevant data, as discussed above.

At S106, the master stock database 34 may be updated, based on the acquired reports 94 and/or predictions generated therefrom by the prediction model(s).

Steps S102 to S106 may occur on the server hosting the system 12.

Thereafter, at S108, at the customer's location, at least a part of the MDB 34 may be stored locally, as database 108. Alternatively, or additionally, the MDB 34 may be accessed by the printer, e.g., through a web portal.

At S110, the operator (and/or the control system 90) launches the setup wizard 122.

At S112, the operator removes the packaging 61 from the stock 60 to be used.

At S114, the barcode 64 is detected. If one exists, it may be scanned, e.g., by the operator, or automatically. For example, the barcode reader 66 is brought into close proximity with the barcode 64 and generates a signal 68 corresponding to the barcode. Otherwise, the user may be asked to input the barcode information, if available. In some embodiments, the user may be permitted to select a previously-input barcode, or the last-used one may be automatically selected by default.

At S116, the stock 60 is loaded into one of the paper trays 44, 46, 48.

At S118, stock attributes (including the nominal stock dimensions) for the paper may be retrieved from the stock database and automatically populated, based on the barcode information 68, if available.

At S120, environment data (e.g., temperature, humidity) 80 may be obtained from the environment detector(s) 78.

At S122, the stock database 34, 108 may be checked to determine whether there could be reliability problems for the stock, given the stock attributes and environment data 80. Alternatively, or additionally, the prediction component 184 may be called on to make a prediction as to whether or not the stock will run with suboptimal performance.

At S124, the stock size may be measured, by the size sensor 70.

At S126, the size of the loaded stock measured at S124 may be compared to the barcode database for any conflicts.

Optionally, at S128, a determination may be made as to whether the stock will run acceptably on the device. If at S128, the stock is determined not to be acceptable (environment data 80 and/or printer attributes likely to be unsuitable and/or size comparison shows stock size to be outside tolerance, e.g., based on information stored in MDB or LDB and/or predicted using the prediction component 186) the method proceeds to S130, otherwise to S132.

At S130, if the system suggests a likelihood of performance problems based on environment data 80 or other printer variables, the operator may be:

warned of the predicted performance problem(s);
prompted to modify the environment;
prompted to modify device parameters/run set-up routines; and/or
provided with the opportunity to select a different stock, e.g., through a query 136 to the stock database 34 (or the stock prediction model 210) to identify a stock with similar stock attributes but which has a lower or no likelihood of performance problems.

For example, when the system 12 suggests a stock size mismatch, the operator may be warned and/or provided with the opportunity to select a different stock, e.g., through a query 136 to identify a stock from the stock database with similar attributes. Alternatively, the operator may be permitted to request the system to modify the printer settings to accommodate the actual paper size. In some embodiments, the customer may elect to switch off one or more of these prompts/warnings, or to select a mode in which the warnings/prompts are only provided when the system determines that the likelihood of performance problems is high, e.g., when the system has sufficient data to predict performance problems with a high level of confidence, which is above a predetermined threshold.

The method may proceed from S130 to S132 (or directly to S132 from one of the earlier steps), where setup commences/continues. At S132, advanced media settings (blowers, temperatures, etc.) may be automatically populated for optimal performance, while other settings may be user-selected from a menu displayed on the LUI 84. S132 may include calling on the prediction component 184 to predict suitable printer settings 204, including device parameters and/or setup routines, using the setting prediction model 204.

Once setup is complete, at S134, one or more print jobs may be executed using the printer settings.

At S136, a report 94 or reports may be automatically generated for the selected stock used in printing the print jobs, based on the performance data 74 collected by the reliability detectors 74 and optionally one or more of: the print job features, the environmental conditions, stock attributes, such as the determined size, and the printer settings used. The method can proceed to S104, where the prediction model(s) are updated and/or the MDB updated accordingly.

As will be appreciated, the method may return to S112 when the stock is changed.

The prediction component 186 can be called on at various times to provide one or more predictions (S138), as indicated by the dashed lines in FIG. 9. Additionally, a user can query the stock database and/or prediction component (S140) to identify a suitable stock, and/or for a review of how a selected stock is expected to perform, at other times, e.g., prior to S114.

The method ends at S142.

In one embodiment, predicting an alternative stock may include comparing stock attributes of the alternative stock to attributes of the selected stock to identify one or more stocks with the most similar attributes, according to some similarity measure and, from these stocks, predicting which will perform better than the selected stock, given the print job attributes and the printer attributes.

In one embodiment, the method includes predicting whether a stock may be at risk for sub-optimal performance, based on feedback from the fleet of devices. The method may thus specifically include:

a) Receiving a collection of reports provided by a plurality of the fleet of printers (S102a).
b) Extracting information from the reports provided by a plurality of the printers (S102b) including:
   i) one or more stock attributes, as defined above, such as a stock identifier,
   ii) at least one performance factor, which is based on and/or includes the performance data and/or user supplied performance information, and optionally
   iii) one or more printer attributes, as defined above, and/or
   iv) one or more of the environmental data, as defined above.
c) Using the extracted information to learn a model for predicting whether the stock may be at risk for sub-optimal performance (S104), which may include learning a function which describes a relationship between a given stock and the at least one performance factor(s), and optionally which takes into account one or more of the printer attributes and/or the device environment, or combination thereof.
d) Optionally, incorporating predictions from the learned model into a data structure, such as a table in the master stock database (S106).
e) Providing access to the model and/or database table, by users, or automatically by the devices themselves, e.g., for identifying suitable print media for executing print jobs, identifying alternative print media, or the like. This may include downloading the database table, or a part thereof, to the devices in the fleet.

In one embodiment, the method includes predicting one or more stock-related device settings for device users and/or devices, based on feedback from the fleet of devices. The method may thus specifically include:

a) Receiving a collection of reports provided by a plurality of the fleet of printers (S102a).
b) Extracting information from the reports provided by a plurality of the printers (S102b) including:
   i) one or more stock attributes, as defined above, such as a stock identifier,
   ii) one or more printer attributes, as defined above, including one or more device settings,
   iii) at least one performance factor, which is based on and/or includes the performance data and/or user supplied performance information, and optionally
   iv) one or more of the environmental data, as defined above.
c) Using the extracted information to identify relationships between printer settings and performance, in order to identify one or more group(s) of settings associated with higher performance, on average (e.g., fewer performance problems, according to some predefined measure, than for other groups of settings). This may include learning a model for predicting optimal printer settings for a given stock attribute(s) (S104), which may include learning a function which describes a relationship between a given printer setting (or a set of multiple printer attributes, e.g., as an input vector of values) and the at least one performance factor(s), and optionally which takes into account one or more other printer attributes, such as the device type, print job features, and/or the device environment, or combination thereof. Alternatively, this step may include bucketing the printer settings into a set of buckets covering different combinations of ranges of the printer settings and identifying groups of the bucketed printer settings which at least meet a predefined performance threshold, and optionally at least a threshold confidence (e.g., enough data to provide a reliable inference on performance).

d) Optionally, incorporating predictions from the learned model into a data structure, such as a table in the master stock database (S106).

e) Receiving information for a given device to be used in printing a new job, the information including i) stock attributes, such as a stock identifier for a stock to be used in printing at least one print job, ii) printer attributes, as defined above, generally lacking at least one of the device settings, and optionally, iv) environmental data (S114-S120).

f) Generating the at least one lacking device setting(s) and/or modified device setting(s), using the learned model or table (S132a).

g) Automatically setting or modifying the device setting(s) on the device and/or prompting the user to accept the device parameters and/or run proposed set-up routines to establish current device settings for the selected stock (S132b).

h) Printing at least one print job using the selected stock and current device settings (S134).

i) After at least one print job has been printed, generating/acquiring a new report 94 from the device relating to the selected stock, current device settings, and performance data and/or user supplied performance information, and optionally one or more of the environmental data, as defined above (prompting a return to S102b).

Further details of the system and method will now be provided.

Automated Media Programming

The setup wizard provided by the setup module 122 can significantly improve the user's experience when loading, using, and choosing print media. Benefits to the user of an automated setup system which relies on collected reports from multiple devices may include: finding a suitable stock; a reduction in time to program the printer settings appropriate for the stock; stocks run with optimal printer settings.

There are also benefits in servicing printers due to rapid identification of media-related printer problems.

Benefits may be found in product development, since developers can acquire details of what products customers are running. Additionally, better utilization of printer settings may reduce parts costs by reducing wear on the parts, allowing design of parts that need not be robust to everything.

Media suppliers can also benefit from feedback in the form of ratings and technical data. The feedback may be used to demonstrate quality of stocks to customers, benefits of premium stocks, and drive future improvements.

Table 1 provides a summary of exemplary features of the system 10.

TABLE 1

System Features
Install and setup wizard

| Feature | Description | Capabilities |
| --- | --- | --- |
| Install and Setup Wizard | The wizard is initialized on first use of the printer and thereafter for setting up stock(s) for the first time. | See below. |
| Paper stock programming | The operator can scan a barcode, load paper and then the properties for that paper are applied and paper tray programming is performed. | Scan for existing media<br>Create new barcode<br>Data check - confirm size when a stock is loaded |
| Stock database download | Stock database can be downloaded remotely to all machines. | The frequency of download can be designated, e.g., at the stock management system.<br>Remotely store the stock database on a server in a known location that the printer can pull from.<br>Manual method for a customer to access/download a stock database via a web site. |
| Media database creation | Enable stock suppliers and/or printer manufacturers/vendors to create and update databases to be downloaded by the printers. | Provide access to the server for suppliers, e.g. to update the stock database.<br>Enable database administrator to accept the changes. |
| Cloud Server Access<br>Reports and machine data upload | Enable a system supported in the cloud | Data storage for databases<br>Data storage for machine data<br>Artificial Intelligence for stock properties<br>New stocks added by a customer will be uploaded to the server.<br>Unique machine settings and environmental conditions can be applied to a stock (e.g., fuser temp, transfer settings)<br>Machine reliability related information is used to determine if a stock is running well or not (e.g., if a stock jams a lot then it is flagged, and information uploaded to the server). |
| Web Server GUI | The web portal may provide access to administrators, service personnel, customers, and media suppliers, allowing them to interact with the system. | Stock database administrative functions<br>Customer functions<br>Service functions<br>Media supplier functions |

At installation, the setup module 122 presents the user with a setup wizard (GUI) that walks the user through setting up of the required printer settings to make the printer work and allow printing. It may also familiarize the user with some of the advanced tools for achieving a high image quality, reducing smear, or the like. Some printers may require stocks to be set up initially for the machine to be able to print, so stock setup may be presented to the user at this time. The exemplary setup module 122 is used during installation and also during subsequent stock programming.

The customer can cancel out of the setup wizard at any point in the process. The customer can be informed of how to return to the setup wizard at any time. A setup wizard configuration menu may be provided that allows the customer to turn on/off different parts of the wizard.

At initialization of a printer, the local database 108 may be populated with a few generic pre-programmed stocks. Once details for a stock are retrieved from the main database, they may remain in the LDB 108, although there may be additional information stored in the cloud MDB 34, which may be accessible from the printer. In other embodiments, the local database 108 may be populated with all or a large proportion of the stocks currently in the main database 34 and may be updated regularly to maintain the correspondence.

Initial setup may include requesting the user to input basic data (e.g., location, network settings). The setup wizard will then make sure that the network is connected to the server and will check for the most recent stock database. If the machine is not connected, then the setup wizard will walk the customer through connecting. If the customer chooses not to connect the printer automatically, then the setup wizard may provide instructions for how to retrieve the most recent stock database manually. The printer may be preloaded with data available at the time of initial manufacturing of the device. However, this will not be the most recent version of the stock database, and the connection will be helpful for more usage of the capabilities.

The setup wizard then assists the user in loading and setting up stocks. These stocks may be selected by the user, based on what stocks the customer has on hand or regularly uses.

In some embodiments, at S140, the setup wizard may display a "Find the best stock for my printer," interface on the LUI which allows the operator to browse human-readable information 196 (FIG. 8) on candidate stocks though a web user interface. The information may include a rating 200 for candidate stocks that allows user to see which medias are expected to work best. At S114, the user may be instructed to scan the barcode for the first print media that they wish to use. The customer is then instructed to insert the paper into one of the available trays. Based on the characteristics of the paper that the user has scanned, the user may be prompted to use an appropriate tray (lighter weight, 8.5×11 in paper should be loaded in tray three for example). If the customer has an oversized high-capacity feeder (OHCF) the user may be informed of the differences between the internal and external trays (e.g., registration, weight restrictions, feeding, performance). In general, heavier weight, larger stocks should be setup in one of the OHCF trays.

A configuration item in the stock database 138 may be used to identify which paper trays are best for the stock. If this item is not populated, then the wizard may follow a set of rules (e.g., defined in an xml file for the specific system) to determine where the stock is best run, based on the attributes of the stock (e.g., weight, color, size, grain).

The customer may be asked for information on the print jobs, such as whether a print job will be image quality (IQ) sensitive, and if so, ask them if they wish to set up the printer for the best possible operation for that paper.

Depending on the stock that the customer is using, and any specific IQ requirements, the customer is walked through the appropriate setup routine. For stocks that are known to need trail edge setup, for example, the customer may be take through a trail edge smear setup. Similarly, for stocks that need registration setup, an appropriate setup routine is followed.

The setup module 122 may check whether a particular setup was run recently for the particular stock. If it was and the settings should still be applicable, then the setup module 122 may decide that it need not rerun the setups. However, the user may be informed that they can override the decision and run the setups if desired. Based on the age of a setup and/or the type of print media, the customer may be prompted to run a setup. For some setups, it may be desirable to run them more frequently. For example, IQ Setups, an evaluation is made as to whether the setup should be rerun, e.g., based on changes to the environment or other changes since this a setup was last run. A user may be given the opportunity to run a test print, review the results of the test print, and rerun one- or more of the setup routines if the results are not satisfactory.

At the conclusion of the setups, the results of the setups may be uploaded to the system 12 (S136). This may include providing the environment data and other relevant printer settings (e.g., xerographic set points that would be affected by parts age) to enable analysis of the data for incorporation into the stock database 34 and/or for training/updating one or more of the prediction models 202, 204, 210, 212.

The computer system 10 may include several computing devices 12, 20, 22, 24, 90, such as a PC, such as a desktop, a laptop, palmtop computer, portable digital assistant (PDA), server computer, cellular telephone, tablet computer, pager, dedicated microprocessor-controller, combination thereof, or other computing device capable of executing instructions for performing the exemplary method.

The memory 30, 150, 100, 152, of each computing device may represent any type of non-transitory computer readable medium such as random access memory (RAM), read only memory (ROM), magnetic disk or tape, optical disk, flash memory, or holographic memory. In one embodiment, the memory comprises a combination of random access memory and read only memory. In some embodiments, the processor and memory may be combined in a single chip. The network interface 38, 106, 162, 164 allows the respective computer to communicate with other devices via a computer network 26, such as a local area network (LAN) or wide area network (WAN), or the internet, and may comprise a modulator/demodulator (MODEM) a router, a cable, and/or Ethernet port.

The digital processor devices 36, 104, 158, 160 can be variously embodied, such as by a single core processor, a dual core processor (or more generally by a multiple core processor), a digital processor and cooperating math coprocessor, a digital controller, or the like. The digital processors, in addition to executing instructions stored in respective memory, may also control the operation of the respective device.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so called "firmware" that is software stored on a ROM or the like. Such software may be organized in various ways, and may include software components organized as libraries, Internet based programs stored on a remote server or so forth, source code, interpretive code, object code, directly executable code, and so forth. It is contemplated that the software may invoke system level code or calls to other software residing on a server or other location to perform certain functions.

The method illustrated in FIG. 9 may be implemented in a computer program product that may be executed on one or more computers. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the respective computer (for example, an internal hard drive of RAM), or may be separate (for example, an external hard drive operatively connected with the computer), or may be separate and accessed via a digital data network such as a local area network (LAN) or the Internet (for example, as a redundant array of inexpensive or independent disks (RAID) or other network server storage that is indirectly accessed by the respective computer, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer (s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphics card CPU (GPU), or PAL, or the like. In general, any device, capable of implementing a finite state machine or machines that is/are in turn capable of implementing the flowchart shown in FIG. 9, can be used to implement the method. As will be appreciated, while the steps of the method may all be computer implemented, in some embodiments one or more of the steps may be at least partially performed manually. As will also be appreciated, the steps of the method need not all proceed in the order illustrated and fewer, more, or different steps may be performed.

Examples of Media Programming

The following cases, summarized in TABLE 2, are intended to be illustrative, and are not intended to be comprehensive of all cases. In each case, the various setup wizard(s) will be used when accessed as appropriate.

TABLE 2

Examples of media programming

| | Input | | | Configuration settings | | | | |
|---|---|---|---|---|---|---|---|---|
| Case | Barcode (y/n) | Paper in local DB (y/n) | Paper updates in MDB (y/n) | Paper tray select wiz (y/n) | IQ setting wiz (y/n) | Reg. setup only wiz (y/n) | Paper size check (y/n) | Overwrite w/ MDB |
| 1: Scan then load | Yes | Yes | Yes | Yes | Yes | No | Yes | Yes |
| 2: Scan then load | Yes | Yes | Yes | No | No | No | No | Yes |
| 3.1: load first +scan | Yes | Yes | Yes | No | No | No | No | Yes |
| 3.2: +No scan | No | NA | NA | No | No | No | NA | NA |
| 3.4: +No scan | NA | NA | NA | No | No | No | NA | NA |

TABLE 2-continued

Examples of media programming

| | Input | | | Configuration settings | | | | |
|---|---|---|---|---|---|---|---|---|
| Case | Barcode (y/n) | Paper in local DB (y/n) | Paper updates in MDB (y/n) | Paper tray select wiz (y/n) | IQ setting wiz (y/n) | Reg. setup only wiz (y/n) | Paper size check (y/n) | Overwrite w/ MDB |
| 4: Scan then load | Yes | No | Yes | No | No | No | No | NA |
| 5: Scan then load | Yes | No | No | No | No | No | No | NA |

Note that the scanning and paper tray loading are asynchronous, so the applicable actions can occur at various times.

Case 1

The customer scans the barcode 64 for the stock 60 and inserts the paper in an appropriate paper tray 44, 46, or 48. If the stock ID component 110 determines that it is the same stock, then the performance data for the previous stock may be loaded automatically. The size comparison module 118 confirms that the paper size matches the known paper size. No action/prompt is therefore required for the customer. The DB management module 114 retrieves the settings for that stock from the local database 108 and/or checks the main stock database 34 for applicable printer settings for the stock, based on available information. If relevant updates are available, they are sent back to the printer. In some embodiments, the prediction component 186 may be called on to predict suitable printer settings on-the-fly. The stock identifier 68, environmental and related xerographic settings (that may be affected by parts age or toner condition) may be uploaded to the system 12 and may be input to the setting prediction model 202 for predicting one or more printer settings, which are returned to the printer. The setup module 122 prompts the user to run through the relevant paper setups and may allow the user to skip this step if desired.

Case 2

In this case, procedure is similar to Case 1, but the user elects not to run through the relevant paper setups.

Case 3

Figure 10:
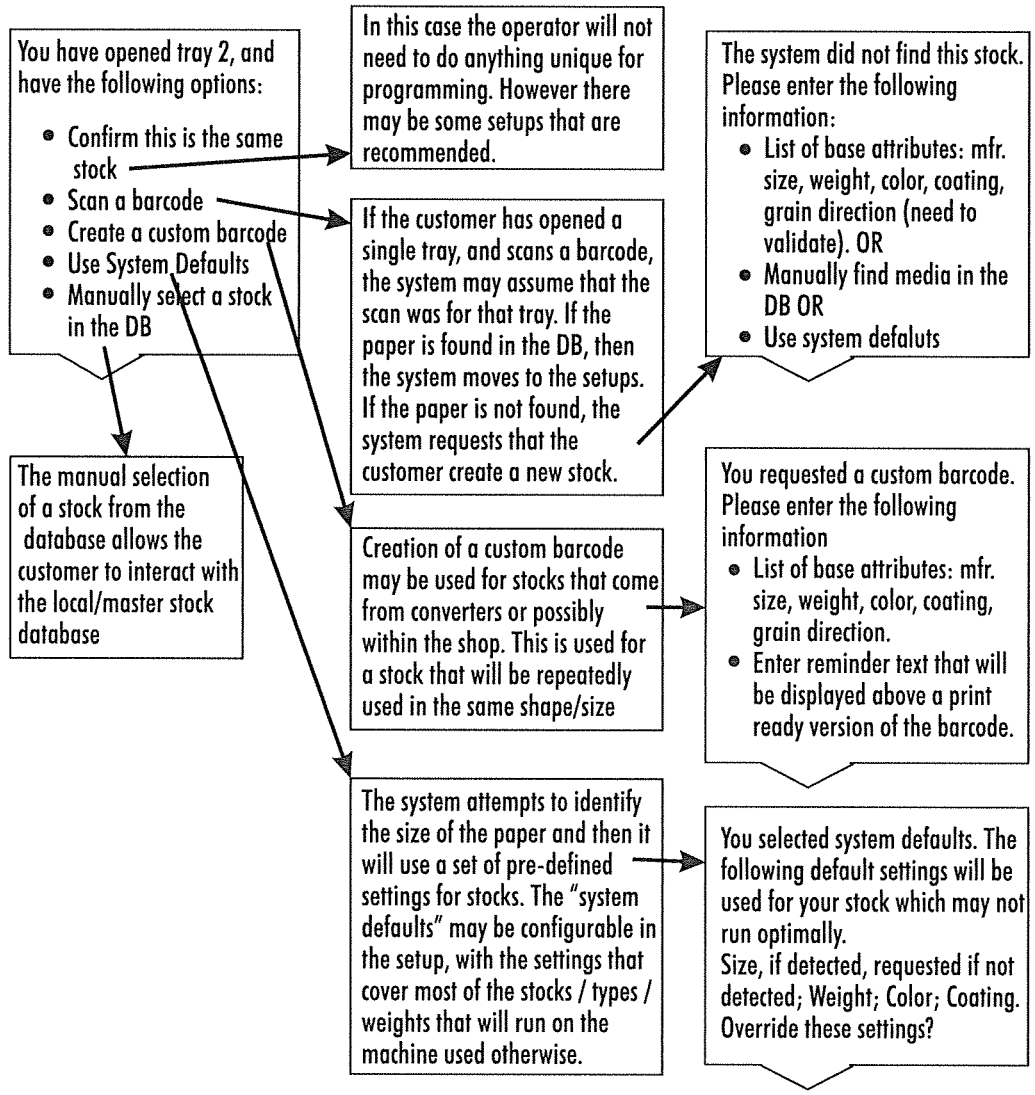
FIG. 10 illustrates information displayed on a graphical user interface during printer setup for a stock.

In this example, the customer loads the paper into the paper tray without scanning the barcode first. The system prompts the user to select from several options, such as "scan barcode," "create barcode/new stock," "use system defaults," "find stock in database," "same stock." FIG. 10 illustrates an example user interface.

Case 3.1:

If "scan barcode" is selected, the customer scans the barcode for the stock. The printer then retrieves the settings for that stock from the local database and/or checks the system 12 for applicable stock settings, proceeding as for Case 1.

Case 3.2:

If "create barcode/new stock" is selected, the setup module 122 prompts the user to enter the appropriate stock information (e.g., manufacturer, size, finish, grain, weight, color). The new stock information is uploaded to the system 12, with a request for a new barcode. The DB manager 182 creates new barcode and stores it in a new stocks list with the information for the new stock as a candidate for inclusion in the MDB 34. The DB manager sends the new barcode in printable format to the printer. The customer may choose to print the barcode for future use (tape to the paper drawer, put in a notebook, etc.). The DB manager informs an administrator of the new stock creation, who can check the content before including it in the MDB 34.

Case 3.3:

For "use system defaults," the setup module 122 may create a "custom" or "generic" stock. The associated size may be detected by the size comparison module 118, or the customer may be prompted to select/program a size. Generic settings will be loaded for the stock. The customer may be notified that the stock may run sub-optimally and be given an opportunity to enter the routine for Case 3.1 or 3.2.

Case 3.4:

If "find stock in database" is selected, the customer is presented with the option to review the local stock database 108 and can select from the available stocks. The customer can select to update the local database in the event the stock is not present. Alternatively, the user can select to create a new stock and follow the procedure in 3.2. When this mode is selected, a flag may be generated in the system.

Case 3.5:

If "same stock" is selected, the setup module retrieves the last printer settings that were set. The setup module may ask the customer to confirm some of the settings, particularly if the measured stock size does not correspond to the previously measured stock size.

Case 4

The customer scans the barcode 64 for the stock 60 and inserts the paper in an appropriate paper tray 44, 46, or 48. In this case, the stock ID component 110 does not find the stock in the LDB 108, so the MDB 34 is checked for the stock and applicable stock settings. The stock identifier (barcode), environmental and related xerographic settings (that may be affected by parts age or toner condition) are uploaded to the system 12. The system 12 determines if relevant updates are available and sends them back to the printer.

Case 5

The customer scans the barcode 64 for the stock 60 and inserts the paper in an appropriate paper tray 44, 46, or 48. In this case, the stock ID component 110 does not find the stock in the LDB 108, and a check shows the MDB 34 does not include the stock. The setup module prompts the user to enter the appropriate stock information (manufacturer, size, finish, grain, weight, color, etc.). The stock information for the new stock is uploaded from the printer to the system, and the method proceeds as for 3.2.

In these scenarios, it is assumed that the barcode scanned corresponds to a drawer which the customer has opened, as detected by a suitable sensor. As will be appreciated, the setup may include additional steps to clarify the correspondence if, for example, the customer scans two or more barcodes, opens more than one paper drawer, or the like.

Automated Media Programming—Size Check

At S124, when the printer identifies a match of a barcode with a media that is in the database, then the size comparison module 118 compares the nominal size information 130 with the measured size data 72. If the size matches, a transient confirmation memo may be displayed on the LUI. However, if there is a detected size mismatch then the setup module may present the stock information associated with the barcode on the LUI and prompt the customer to rescan the barcode. If the barcode is different, then the process/check is restarted. If, however, the barcode is the same, then the setup module may permit the customer to tailor the stock attributes (in particular, the size). The control system will then inform the cloud system 12 that there is a size mismatch, together with any other attributes that were different.

The DB manager 182 of the system 12 sends a message, such as an email to a DB administrator and related vendor informing them of the size mismatch. Future downloads for that media type may be disabled until the size mismatch can be rectified by the DB administrator.

As will be appreciated, such a situation may occur if the customer has reused a barcode from a different stock.

Automated Media Programming—Unidentified Reams

Certain customers do not use off-the-shelf stocks but send selected stocks to converters to have them cut to size. The converters then wrap the reams in brown paper and send them back. In most cases, these reams have few, if any markings, and may lack a barcode. In such a case, the system 12 may either allow the converter to download a barcode label to be printed for a frequently used stock, or it may allow a customer to print out a barcode that can be scanned (as opposed to having the barcode on the wrapper). See, for example, U.S. Pat. No. 7,812,995, issued Oct. 12, 2010, entitled MACHINE SETUP BY SCANNING A CONFIGURATION SHEET, by Braswell, et al., the disclosure of which is incorporated herein by reference in its entirety, for an example of a configuration sheet incorporating a barcode. This temporary barcode may be stored by the system 12. The MDB administrator is able to create an entry in the MDB for the new stock associated with this barcode for further use by other customers, or the MDB may store this stock specific to the customer such that it is not accessible to other customers.

A manual method of doing this offline may also be provided, e.g., through a web portal.

Initial Population of Data on the Printer

Initially, the stock databases 34, 108 may be largely empty, but are progressively populated as data is acquired from the fleet of devices. When a new printer is configured, it may be preprogrammed with an initial local stock database 108, which is prepopulated with data for a few generic stocks. This may be done so that the customer is only burdened in their main view with the stocks that they have used. As stocks are used, the relevant data may be downloaded to the local database from the master stock database 34, and subsequently updated to reflect updates to the master stock database. Once information on a stock is downloaded to the device, the stock remains on the device, although there may be additional information in the cloud.

The database management module 114 may have access to the entire stock databases 34, or to an unrestricted portion of it, which allows the setup module 122 to generate a view that includes the entire stock list. The system 12 provide an option to download all or part the database 34 manually, e.g., to the printer 14 or to a customer computing device 20.

Stock Vendors

The system 12 enables stock vendors, such as paper mills, to create their own stock databases 220, which can be provided to the system 12 for upload/incorporation into the master database, e.g., by an authorized user of the master database. Each vendor stock database 220 may include some of the data relevant to their stocks, such as bar codes and corresponding print media attributes, and optionally vendor-recommended printer settings, suitable environment ranges, and the like. The vendor database may also include information acquired from the master database 34 and/or links to information in the database 34. The vendors may upload their databases 220 to the system 12 for access by the customers and/or provide information from which the databases 220 can be created on the system, in some cases, with restrictions on which customers may access all or a part of the vendor database. In other embodiments, the vendors may provide their databases 220 directly to the customers.

Stock vendors may provide the system with stock attributes corresponding to the barcodes they use. Should a stock change, the vendor may be required to generate a new bar code. Additionally, there are multiple barcodes for the same media, these barcodes should be linked to each other in memory.

Stock Database Management

After the customer scans a barcode, the system checks the local or master database for the associated attributes.

In some cases, the printer 14 may periodically ask the system 12 for database updates. All or part of the MDB may be downloaded. In some cases, there may be differences between the MDB and LDB which the user wishes to retain. For example, the customer may have modified settings to get a stock to run better. In this case, the control system may preserve the relevant part of the current LDB, rather than overwriting it, and may give the customer the opportunity to save the updated MDB data as an alternative to the modified values. An "offline" method of retrieving and loading the mater database may be provided, e.g., for printers that are not connected to the system 12.

In some cases, there may be entries in the main or local database which are substantial or total duplicates of each other. The system 12 may identify the first saved and all other systems will use this information. Alternatively, an administrator may select or provide a protocol for determining which entries to maintain.

Automated Media Programming—Data Push

There are several reasons for a printer to automatically push printer settings data to the system 12, such as:

First Time Media Use:

A new stock is programmed for the first time. Pushing a report containing the printer settings data to the cloud for incorporation into the MDB 34 may automate future usage by any customer. Errors in customer inputs may be corrected using vendor-supplied information.

Subsequent Use of Media:

If a user modifies the setup for a stock, this information may be uploaded.

In some embodiments, the printers automatically push printer settings when new ones are detected, or at regular intervals.

Artificial Intelligence

Given the large number of media types, printer settings, environmental conditions, etc., which may affect performance of a stock, crowdsourcing and aggregating data may not provide a complete picture for all the data points. Accordingly, the learning component 184 may learn one or more models 202, 204, 210, 212 for making predictions. Such models may be learned using a supervised or unsupervised machine learning method. Inputs for training and prediction may be in the form of multidimensional, fixed length vectors, one dimension for each of a set of features on which the prediction is based.

Some prediction models useful herein learn weights for the features, which are a function of the relative importance of each feature to the overall prediction, such as logistic regression models employing linear or polynomial (e.g., quadratic) fits. Other models learn weights for hidden variables, such as Gaussian mixture models and recurrent neural networks. Clustering models, such as k-means clustering, learn to cluster the input data into one of a predefined number of clusters. New data can then be assigned to the nearest cluster. Matrix decomposition models learn to decompose a matrix of data into factor matrices composed of hidden variables, from which a reconstructed matrix can be generated, which includes data predictions for at least some of the cells. Other models employ conditional random fields (CRF), which take into account the sequence in which data is received. Other types of model include decision trees, and the like.

In some cases, the input data and/or output predictions may be bucketed into non-overlapping ranges to make model learning easier.

Thus, for example, from a reported set of performance data and corresponding printer settings and optionally other information acquired from the printer and/or user, the learning component 184 may learn a model to predict printer settings. The prediction component 186 may be used, for example, to recommend printer settings for a stock used for a first time in a specific environment based on the properties of the stock. The predictions may be in the form of a range for one, some, or all of the printer settings. For example, a fuser temperature in the range of 190-200° C. may be predicted to be suitable, in combination with other printer settings. The prediction component may use predicted settings which the user has then tweaked to refine the prediction for the same user or for other users.

The media usage, performance statistics (e.g., shutdowns), parts life information, and environmental statistics may be uploaded on a periodic basis. The system 12 may use the input data in various ways, such as:

1. To predict the best operating environment for a stock, or, conversely the most appropriate printer settings for a stock in a given environment.

2. To predict that a stock may or may not run well. The media database may contain a signifier identifying whether a media runs well or not. This identifier can be populated based on the predictions. If a media is not expected to run well, then an indicator may be displayed to the customer after a media has been loaded into the machine, which may be a visual (e.g., color) and/or textual indicator (e.g., "Based on experience this media is considered unsuitable").

If the failures are due to an environmental limitation, then the control system may inform the user that the stock will not operate well in that environment.

If the failures are widespread, with significant data indicating poor performance, the control system may inform the user that they should seek an alternative stock. A link may be presented to the user to access the cloud system 12. The customer may also select to research suitable stocks without a prompt from the control system.

To learn a given prediction model, the system 12 ideally acquires a large dataset to facilitate robust algorithm development. Features likely to contribute to the prediction may be manually identified or identified automatically during learning.

In an example learning method for predicting printer settings, data sets (records) may be manually or automatically accumulated for significant events from the reports from the printers for a given stock and corresponding printer settings acquired from setups for the stock. From the collected records, a first subset of the records may be used to learn a model using ML techniques. The model is then applied on the remaining records to verify prediction. The procedure iterates through several folds of the data until convergence is reached. Such a method is best suited to datasets of 1000 records, or more, although smaller datasets can be used in some cases. Initially, when there is no data from the printers, a prediction model may be learned with default values for printer settings.

In some cases, some of the training data may be labeled as positive or negative, based on feedback from the printers, which allows a supervised learning method to be used. The positive label is applied when a customer has accepted a prediction, such as new printer settings and/or setup routines for a given stock (in the case of predicted settings 206), a suggested stock (in the case of a predicted stock 208). The negative label is applied if the customer has not accepted either the prediction or machine defaults.

In some cases, learning the model includes learning a function F which takes as input training data of the general form (stock, performance data), where "stock" may be an identifier which uniquely identifies the stock and "performance data" may be a feature or a set of two or more features corresponding to faults associated with the stock, such as rate of shutdowns, fuser errors, jam rates, etc. The function F defines a correlation between stock and performance data (and optionally other features, such as one or more of printer settings, machine noise, environment, etc.). When the function is input with a stock, the function outputs predicted performance data, which can be converted to an expectation of whether the stock will or will not run well.

In some cases, learning the model includes learning a function F which takes as input training data of the general form (stock, printer settings), where "stock" may be an identifier which uniquely identifies the stock and "printer settings" may be a set of features corresponding to printer settings/set up routines used with that stock. The function F defines a correlation between stock and printer settings (and optionally other features, such as one or more of environment, performance data, etc.). When the function is input with a stock, the function outputs predicted printer settings/ set up routines, which can be downloaded to the printer during scanning or job programming.

Printers 14, 16, 18 may be set up to track and keep the last 100,000 (or other preset number) of fault logs from the reliability detectors 74. Reports 94 based on these logs may be periodically generated, uploaded to the system, and processed by the learning component to update one or more of the prediction models 202, 204, 210, 212, which may then be used to update/generate entries in the master database 34.

An example machine learning approach employing linear regression may be as follows. The printers start pushing data 94 for different media stocks. A unique key is used for every push (Key=epoch time_printer serial number). The learning component 184 uses rules and/or data mining to look for correlation and patterns for specific printer settings as they relate to a stock 60.

System Access

Administrators of the database 34 may access the system 12, e.g., via an administrator computer 24, to review stock performance, upload data to the database, review computer-generated reports of poorly-performing stock, put poorly performing stocks on hold, remove duplicate stocks from the database 34, update local databases directly, rectify size or other mismatches reported for a stock, accept a new stock from a customer, register vendors, manual creation of customer accounts. Service representatives may use the database to research stocks to determine if a stock may not work on a machine or in an environment or to provide input stocks. Access to all or parts of the database by administrators, customers, service engineers, and/or vendors, for viewing and/or modification may be limited, based on the authorizations granted to the particular user.

Printers and other computer devices may be able to automagically log in to the system through global resource serialization (GRS) protocols. The GRS infrastructure may also be used for hosting the web service.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A feedback system comprising a fleet of printers and a prediction system, in communication with the fleet of printers, for predicting one or more stock-related device settings for one of the printers in the fleet, the prediction system comprising:
   memory which stores:
      a crowdsourcing component, which acquires reports from multiple printers in the fleet of printers, the reports each comprising performance data and printer attributes used when printing one of a plurality of stocks, the printer attributes comprising at least one device setting;
      a learning component which learns relationships between printer settings and performance, based on the acquired reports;
      a prediction component which uses the learned relationships to predict device settings for the stock for at least one of the printers in the fleet of printers; and
   a processor, in communication with the memory, which implements the components.

2. The system of claim 1, wherein the performance data for a respective one of the printers is based on or includes information received from reliability detectors associated with the respective printer.

3. The system of claim 1, wherein the printer attributes further comprise at least one of:
   a printer identifier;
   fixed printer features which are fixed for a given device; and
   machine component lifetime signals.

4. The system of claim 1, wherein at least some of the reports comprise stock attributes selected from a weight, a color, a determined size, and a coating type, and wherein the learning component learns the relationships, based on the stock attributes in the acquired reports.

5. The system of claim 1, wherein at least some of the reports further comprise environment data acquired for an environment of the respective printer, and wherein the learning component learns the relationships, based on the environment data in the acquired reports.

6. The system of claim 1, further comprising a master database and instructions for updating the master database based on the predictions.

7. The system of claim 6, further comprising instructions for updating a local database, local to a respective one of the printers, based on the updated master database.

8. The system of claim 6, wherein the master database includes, for each of a plurality of stocks, correlations between one or more of the printer settings and performance of the stock.

9. The system of claim 1, wherein the prediction component predicts environmental conditions for performing printing on the respective stock.

10. The system of claim 1, wherein the device settings in the acquired reports include at least one of:
    values for adjustable parameters that have been selected for printing the stock, and
    set-up routines which have been used for identifying values for adjustable parameters that have been selected for printing the stock.

11. The system of claim 1, wherein the at least one device setting comprises at least one of a feeder setting, a fuser setting, a nip setting, and a color setting.

12. The system of claim 1, further comprising a database management component generates a database table based on the predicted device settings for a plurality of stocks.

13. The system of claim 12, further comprising an output device which outputs at least a part of the database table to at least one of the fleet of printers.

14. A method for predicting one or more stock-related device settings, comprising:

via a computer network, acquiring reports from multiple printers in a fleet of printers, the reports each comprising performance data and printer attributes used when printing a respective one of a plurality of stocks, the printer attributes comprising device settings;

extracting information from the reports;

using the extracted information to learn a model for predicting optimal printer settings for a given stock attribute, include learning a function which describes a relationship between a set of multiple printer attributes, and the performance data;

receiving information for a given printer to be used in printing a new job, the information including stock attributes for a selected stock and printer attributes, where at least one device setting is lacking or is modifiable;

with a processor, generating device settings for printing a print job on one of the plurality of stocks with one of the printers in the fleet, using the learned model, based on the received information; and automatically setting or modifying the device settings on the device, or prompting a user to accept the device settings or run proposed set-up routines to establish current device settings for the selected stock.

15. The method of claim 14, wherein the generating device settings comprises at least one of:

identifying values for adjustable parameters for printing the stock, and identifying at least one set-up routine for identifying values for adjustable parameters for printing the stock.

16. A computer program product comprising a non-transitory recording medium storing instructions, which when executed on a computer, causes the computer to perform the method of claim 14.

17. A system comprising memory storing instructions for performing the method of claim 14 and a processor, in communication with the memory, which executes the instructions.

18. A method for selecting device settings for printing a print job on a printer in a fleet of printers with a selected stock, comprising:

setting printer settings for a first of the fleet of printers to print a first print job on a first stock, the first stock having a set of stock attributes;

printing the first print job using the first stock on the first printer using the printer settings;

generating at least one report for the stock based on performance data generated by the first printer;

submitting the at least one report to a stock management system;

receiving, from the stock management system, printer settings for printing a second print job on the first printer with a second stock, the printer settings for the second stock having been derived from a plurality of reports for the stock based on performance data generated by at least a second of the plurality of printers.

19. The method of claim 18, wherein the generating of the at least one report comprising generating at least one report including the printer settings employed by the first printer to print the first stock.

20. The method of claim 18, further comprising detecting environmental conditions in a location of the first printer, the at least one report for the stock incorporating the environmental conditions, the printer settings for the second stock being based on the environmental conditions.

* * * * *